United States Patent
Yano

[11] Patent Number: 6,029,925
[45] Date of Patent: Feb. 29, 2000

[54] WINDING MACHINE HAVING FREELY POSITIONABLE NOZZLE AND METHOD THEREFOR

[75] Inventor: Fumiharu Yano, Date-gun, Japan

[73] Assignee: Nittoku Engineering Co., Ltd., Saitama-Ken, Japan

[21] Appl. No.: 09/106,230

[22] Filed: Jun. 29, 1998

[30] Foreign Application Priority Data

Jul. 2, 1997 [JP] Japan .................................. 9-177427

[51] Int. Cl.⁷ ........................... B65H 81/06; H01F 41/06
[52] U.S. Cl. .................................... 242/440.1; 242/445.1
[58] Field of Search ............................. 242/437.2, 445.1, 242/439.1, 439.4, 440.1, 447.1

[56] References Cited

U.S. PATENT DOCUMENTS

| | | | |
|---|---|---|---|
| 4,157,165 | 6/1979 | Bierman et al. | 242/440.1 X |
| 5,263,639 | 11/1993 | Lee et al. | |
| 5,544,827 | 8/1996 | Yano | 242/445.1 |
| 5,775,626 | 7/1998 | Ono et al. | 242/440.1 X |
| 5,806,781 | 9/1998 | Ujita et al. | 242/447.1 X |

FOREIGN PATENT DOCUMENTS

| | | |
|---|---|---|
| 608 807 A2 | of 0000 | European Pat. Off. |
| 39 10361 A1 | of 0000 | Germany. |
| 6-93412 | 11/1963 | Japan. |

*Primary Examiner*—Donald P. Walsh
*Assistant Examiner*—Emmanuel M. Marcelo
*Attorney, Agent, or Firm*—Pearne, Gordon, McCoy & Granger LLP

[57] ABSTRACT

A winding machine and method, by which it is possible to perform winding and tying operations suitable for each shape of various kinds of work pieces, to fix wire tension, and to prevent breaking of wire and deformation of the wire fixing section. The winding method is performed by a winding machine comprising a nozzle which is movable while letting out a wire; driving device for driving the nozzle; direction setting device for setting the direction of the nozzle; and winding section rotating device having a winding section rotating shaft for rotating a winding section so as to wind the wire, and wherein the wire is wound around a winding section via rotation of the winding section by the winding section rotating device under a condition in which the direction of the nozzle is set such that the angle between the wire and the nozzle is set to be 10 degrees or less; and the nozzle is moved by the driving device at the time of starting and ending the winding so that the wire is extended to a wire fixing section, positioned near the winding section, to which the wire is tied and fixed.

8 Claims, 7 Drawing Sheets

WINDING MACHINE HAVING FREELY POSITIONABLE NOZZLE AND METHOD THEREFOR

BACKGROUND OF THE INVENTION

1. Field of the Invention

The present invention relates to a winding machine and method particularly suitable for winding thick wire. This application is based on Patent application No. Hei 9-177427 filed in Japan, the contents of which are incorporated herein by reference.

2. Description of the Related Art

FIGS. 6 and 7 show an example of a conventional winding machine. In the winding machine, reference symbol W indicates a work piece (i.e., stator), reference symbols P' indicate winding sections (i.e., magnetic poles), reference symbols T' indicate wire fixing sections (i.e., terminals), reference symbol L indicates a wire (i.e., lead wire), reference symbol K' indicates a base, reference numeral 1 indicates the winding machine, reference numeral 2 indicates a nozzle, reference numeral 3 indicates driving means, reference numeral 4 indicates direction switching means, reference numeral 5 indicates winding position setting means, reference numeral 6 indicates wire cutting means (i.e., a wire cutter), and reference numeral 7 indicates a temporary tying pin.

Work W has, for example, plural magnetic poles P' projecting into the center, and has terminals T', disposed on its upper surface, to which wire L is connected, as shown in FIG. 6.

On base K' of the winding machine 1, nozzle 2 which is movable while pulling out wire L; driving means 3 for driving the nozzle 2; direction switching means 4 for making the direction of nozzle 2 switchable; and winding position setting means 5 for determining a position of winding section P' around which the wire L is wound are arranged. Additionally, nozzle 2 is moved in a manner such that it winds the wire W around winding section P', and the wire L is fixed to wire fixing section T' when winding is completed.

The driving means 3 consists of three-directional driving sections 31', 32' and 33', that is, cross-direction driving section 31', longitudinal-direction driving section 32', and vertical-direction driving section 33', combined with each other.

These driving sections 31', 32', and 33' have approximately the same driving mechanism along each driving direction X, Y, and Z.

The vertical-direction driving section 33' comprises vertical-direction guide 33A' arranged along driving direction Z, vertical-direction rotational shaft 33B' arranged in parallel with the vertical-direction guide 33A' and possessing male screw B on its surface, vertical-direction moving section 33C', combined with the vertical-direction rotational shaft 33B' via a ball screw, being movable along vertical-direction guide 33A', vertical-direction connective section 33D' connected with vertical-direction moving section 33C', and vertical-direction drive source 33E' for rotationally driving vertical-direction rotational shaft 33B'.

The vertical-direction rotational shaft 33B' is connected with vertical-direction drive source 33E' via universal joint 33F'. The moving range in driving direction Z of the vertical-direction moving section 33C' is determined according to the range of male screw B arranged on vertical-direction rotational shaft 33B'.

The cross-direction and longitudinal-direction driving sections 31' and 32', having structures similar to vertical-direction driving section 33', are respectively arranged along driving directions X and Y, as shown in FIG. 6. The cross-direction driving section 31' is fixed on base K and comprises (cross-direction) driving source 31E'. The longitudinal-direction driving section 32' is disposed such that the section 32' is movable via cross-direction connective section 31D' in the cross direction with respect to cross-direction driving section 31'. The longitudinal-direction driving section 32' comprises (longitudinal-direction) driving source 32E', and the vertical-direction driving section 33' is disposed such that the section 33' is movable via longitudinal-direction connective section 32D' in the longitudinal direction with respect to longitudinal-direction driving section 32'.

In vertical-direction driving section 33', vertical-direction connective section 33D' is horizontally projected in front of vertical-direction rotational shaft 33B'. Nozzle 2 is provided in vertical-direction driving section 33' via vertical-direction moving section 33C' coupled with vertical-direction rotational shaft 33B' and via vertical-direction connective section 33D', where nozzle 2 can move in the vertical direction with respect to vertical-direction driving section 33'.

Direction switching means 4 is arranged at vertical-direction connective section 33D', as shown in FIGS. 6 and 7, by which the direction of nozzle 2 can be switched between a vertical direction such as downward direction U and a direction perpendicular to the downward direction U, such as rear direction F. The direction switching means 4 comprises nozzle holder 41 extending downward from the head side of vertical-direction connective section 33D'; nozzle rotating section 42 rotatably attached to the nozzle holder 41; and direction setting section 43 for determining the direction of the nozzle rotating section 42.

As shown in FIG. 7, at the base-end side of nozzle holder 41, guide roller 41A for introducing wire L to nozzle 2 is provided. The nozzle rotating section 42 is rotatably attached to the lower end of nozzle holder 41 via shaft 41B, and nozzle 2 is provided to nozzle rotating section 42. The direction setting section 43 comprises crank 44, connected to nozzle rotating section 42, for rotationally driving nozzle rotating section 42 when the section 43 moves in the direction of its length, and crank driver 45 for driving the crank 44 in the vertical direction. The crank 44 comprises lower crank 44A connected with nozzle rotating section 42 via axis 42A, and upper crank 44B connected with crank driver 45. The lower and upper cranks 44A and 44B are connected with each other via joint 46 for enabling nozzle rotating section 42 to rotate when crank 44 is driven.

Winding position setting means 5 is disposed on base K', on which stator W is fixed. The setting means 5 is connected with a servo motor or the like, and has an index mechanism for rotating stator W by the pitch of (or distance between) magnetic poles P' when winding of each magnetic pole is completed.

Wire cutting means (wire cutter) 6 is disposed at a position on base K', suitable for cutting wire L, and comprises cutter 61' for cutting wire L; moving section 65 to which the cutter 61' is provided; motion rail 62' for defining the (moving) position of the moving section 65; a driving source (not shown), provided inside the motion rail 62', for moving cutter 61' along motion rail 62' by driving moving section 65; cutting operating section 63' for making cutter 61' perform a cutting operation during and in cooperation with the driving operation along motion rail 62' by the driving source; and supporter 64, fixed to base K', for supporting the above parts of wire cutter 6 on base K'.

Temporary tying pin 7 is disposed on base K', near the winding position setting means 5 and wire cutter 6.

In winding operations of the above winding machine 1, by using driving means 3, wire L is wound around winding section P' by moving nozzle 2 around winding section P', and then wire L is tied to terminal T'.

When wire L is tied to terminal T', nozzle 2 is moved around terminal T', as shown in FIG. 8A. In this operation, as shown in FIG. 8B, nozzle 2 is rotationally moved in a manner such that the position of nozzle 2 is always in parallel with terminal T' and has a cylindrical locus around terminal T'. Also in this tying operation of wire L, in which nozzle 2 is moved around terminal T', the angle between the direction of wire L pulled out from the head of nozzle 2 and the direction of the axis of nozzle 2 is θ, as shown in FIG. 8A.

In the above-mentioned winding machine 1, the following problems have occurred.

(1) It is necessary to position nozzle 2 close to terminal T' in order to ensure a precise winding position of wire L. However, on the assumption that the height of nozzle 2 is fixed, the above angle θ increases as nozzle 2 comes close to terminal T' to which wire L is tied. In order to reduce this angle θ in the tying operation, the head of nozzle 2 may be positioned further away in a slantwise and upward direction from the position on terminal T' at which wire L is tied. However, in such a situation, the position for tying wire L is too distant from the position of the head of nozzle 2. Therefore, it is difficult to precisely arrange positional relationships between each element in the tying operation of wire L around terminal T'.

(2) If the tying operation to terminal T' is performed with a large θ0 so as to precisely determine a position for winding, wire L is heavily bent near the opening area of the nozzle head. In this case, the frictional force between nozzle 2 and wire L is increased, and thus great tension is exerted on wire L. Accordingly, if a wire having a small diameter (i.e., a thin wire: approximately φ0.02 mm) is used, the wire may break due to the above tension during the tying operation. On the other hand, if a wire having a large diameter (i.e., a thick wire: φ1.2–1.3 mm) is used, then tension increases by approximately twice as much as the above-mentioned tension; thus, terminal T' may be deformed as shown in FIG. 8C.

(3) If a path or route from winding section P' around which wire L is wound to terminal T' to which wire L is tied must be complicatedly defined, or if the position of terminal T' is away from the direction of nozzle 2, which can be switched between plural directions such as horizontal and downward directions by direction switching means 4, the tying operation using the above winding machine 1 is impossible.

SUMMARY OF THE INVENTION

In consideration of the above problems, the present invention has the following objectives.
(1) To perform winding and tying operations suitable for each shape of various kinds of works.
(2) To define any locus from a winding section to a terminal.
(3) To make wire tension fixed.
(4) To improve accuracy of the winding position.
(5) To prevent breaking of wire and deformation of the wire fixing section.
(6) To perform winding operations suitable for each diameter of various kinds of wires.

To achieve the above objectives, the present invention provides a winding machine comprising: a nozzle which is movable while letting out a wire; driving means for driving the nozzle; and winding section rotating means having a winding section rotating shaft for rotating a winding section so as to wind the wire, and the machine further comprising direction setting means for setting the direction of the nozzle, and wherein the wire is wound around the winding section via rotation of the winding section using the winding section rotating means, and when the wire is extended to a wire fixing section, which is positioned near the winding section and to which the wire is fixed, by moving the nozzle using the driving means at the time of starting or ending the winding, the above fixing is performed using the driving means while the direction of the nozzle is set by the direction setting means.

The present invention also provides a winding method performed by a winding machine comprising a nozzle which is movable while letting out a wire; driving means for driving the nozzle; direction setting means for setting the direction of the nozzle; and winding section rotating means having a winding section rotating shaft for rotating a winding section so as to wind the wire, and wherein the wire is wound around a winding section via rotation of the winding section by the winding section rotating means under a condition in which the direction of the nozzle is set such that the angle between the wire pulled out from the head of the nozzle and the axis of the nozzle is set to be a predetermined value; and when the wire is extended to a wire fixing section, which is positioned near the winding section and to which the wire is tied and fixed, by moving the nozzle using the driving means at the time of starting or ending the winding, the wire is tied and fixed to the wire fixing section.

It is desirable that the driving means be constructed using three-directional driving sections which are combined with each other, that is, a cross-direction driving section, a longitudinal-direction driving section, and a vertical-direction driving section. An exemplary driving section comprises a guide arranged along the driving section; a rotational shaft provided in parallel with the guide, a male screw being arranged on a surface of the shaft; a moving section coupled with the rotational shaft via a ball screw; a connective section connected with the moving section; and a driving source for driving the rotational shaft.

It is possible to fix the cross-direction driving section on a base; to arrange the longitudinal-direction driving section so that it is movable in the cross direction with respect to the cross-direction driving section; to arrange the vertical-direction driving section so that it is movable in the longitudinal direction with respect to the longitudinal-direction driving section; and to arrange the nozzle so that it is movable in the vertical direction with respect to the vertical-direction driving section.

As the driving source, a servo motor or a stepping motor can be used.

The following structure is desirable such that the direction setting means is disposed between the driving means and the nozzle, the direction of the nozzle can be set in synchronism with or independently of the motion of the nozzle by the driving means, and the nozzle is rotatable by a direction-setting rotational shaft perpendicular to the winding section rotating shaft.

The following structure is also desirable such that the direction setting means comprises a direction-setting rotational shaft rotatably attached to the driving means, a driving source for driving the direction-setting rotational shaft, and a direction-setting connective section connected to the direction-setting rotational shaft, and the nozzle is attached to the direction-setting connective section.

The direction-setting connective section may include a direction-setting rotational member which is vertically connected to the direction-setting rotational shaft, and a direction-setting connective member which is arranged away from the axis of the direction-setting rotational shaft and which is connected to the direction-setting connective member in parallel with the direction-setting rotational shaft. In such an arrangement, the nozzle may be attached to the head of the direction-setting connective section in a manner such that the axial directions of the nozzle and the direction-setting rotational shaft are orthogonal and that the head intersects an extension line of the direction-setting rotational shaft.

The direction-setting rotational member may have a disk shape, and near the edge of the disk, the direction-setting connective member is attached.

The plural (e.g., two) guide rollers may be provided at the base end of the nozzle for fixedly making the wire, which enters from a wire supply section into the nozzle, parallel with the nozzle, and the rotational shafts of the guide rollers may be arranged in parallel with the direction-setting rotational shaft.

In a typical operation, at the time of starting and ending the winding, the angle between the wire pulled out from the head of the nozzle and the axis of the nozzle is set to be a predetermined value, for example, 10 degrees or less, by the direction setting means.

As a typical winding operation, the wire pulled out from the nozzle is wound around the winding section which is rotationally driven by the winding section rotating means, and the nozzle is driven by the three-axis simultaneous driving operation performed by the driving means, and the nozzle is moved along the direction of the length of the winding section by the diameter of the wire for each round of the winding of the wire. At the time of starting and ending the winding, the nozzle is driven by the direction setting means and the driving means so as to tie up and fix the wire, pulled out from the nozzle, to the wire fixing section (or the terminal).

In the operation of tying the wire to the wire fixing section, the winding section may be reciprocatively and rotationally moved by the winding section rotating means in synchronism with the driving of the nozzle.

Wire cutting means may be disposed at a position on a base, suitable for cutting the wire, and may comprise a cutter for cutting the wire; a moving section to which the cutter is provided; a motion rail for defining the (moving) position of the moving section; a driving source, provided inside the motion rail, for moving the cutter along the motion rail by driving the moving section; and a cutting operating section for making the cutter perform a cutting operation during and in cooperation with the driving operation along the motion rail by the driving source.

A temporary tying pin may be disposed on the winding section rotational shaft of the winding section rotating section in a significantly vertical direction with respect to the rotational shaft. At the cutting of the wire, the wire is wound around the temporary tying pin and the wire cutting means is disposed near the pin so as to cut the wire.

Tension means is desirable provided in a wire supply section so as to provide fixed tension to the wire which is supplied to the nozzle.

According to the winding machine and method of the present invention, the following effects can be obtained.

(1) By setting the direction of the nozzle by using the direction setting means, it is possible to perform a tying operation to a terminal, which is suitable for each shape of various kinds of work pieces. The most suitable driving of the nozzle can be performed by the driving means and the direction setting means, by which it is possible to perform a winding operation suitable for each shape of various kinds of work pieces.

(2) The nozzle can be driven in three axes by the driving means, and the direction of the nozzle can be set by the direction setting means. Therefore, a locus from the winding section to the terminal can be arbitrarily defined.

(3) Tension imposed on the wire at the head of the nozzle can be reduced by setting the direction of the nozzle by direction setting means, and tension at the opening of the base end of the nozzle can be reduced using the guide rollers, by which the wire tension during the winding and at the time of ending the winding can be fixed.

(4) The relative position of the nozzle with respect to the winding section can be set by the driving means which can perform a three-axis driving operation and by the direction setting means. Therefore, accuracy of the position of the winding can be improved. In addition, the head of the nozzle may intersect an extension line of the direction-setting rotational shaft, and thereby the head of the nozzle is movable with respect to the wire fixing section in an integral moving form with the direction-setting rotational shaft. Therefore, it is possible to easily set the position of the nozzle during winding.

(5) By setting the tension of the wire to be fixed by using the direction setting means and the guide rollers, it is possible to prevent breaking of a thin wire and deformation of the wire fixing section when a thick wire is used.

(6) According to the above advantages, winding operations suitable for each diameter of various kinds of wires can be realized.

DESCRIPTION OF THE PREFERRED EMBODIMENTS

Hereinbelow, an embodiment of the winding machine and method according to the present invention will be explained with reference to the drawings.

Figure 1:
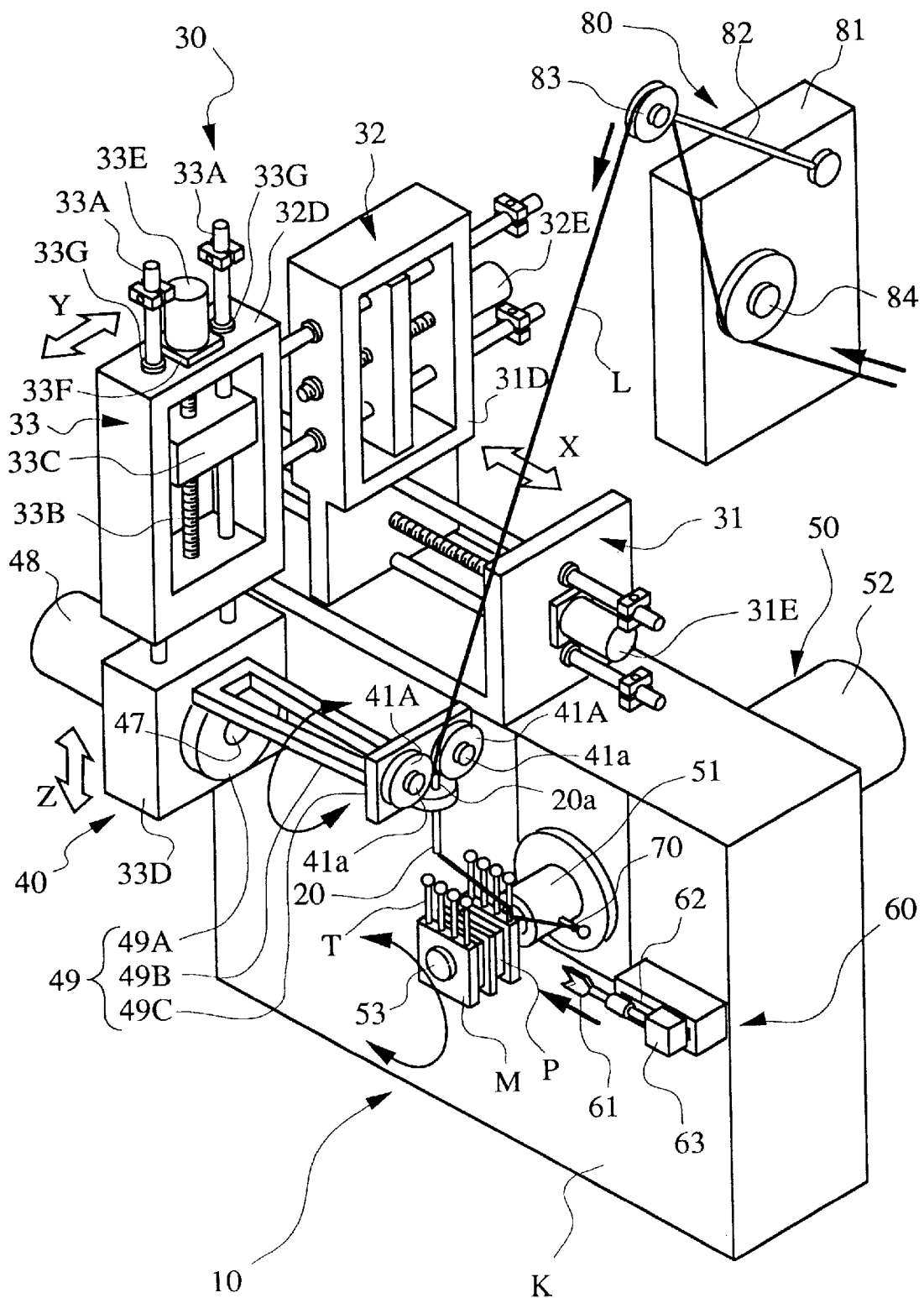
FIG. 1 is a perspective view showing an embodiment of the winding machine and method according to the present invention.
Figure 2:
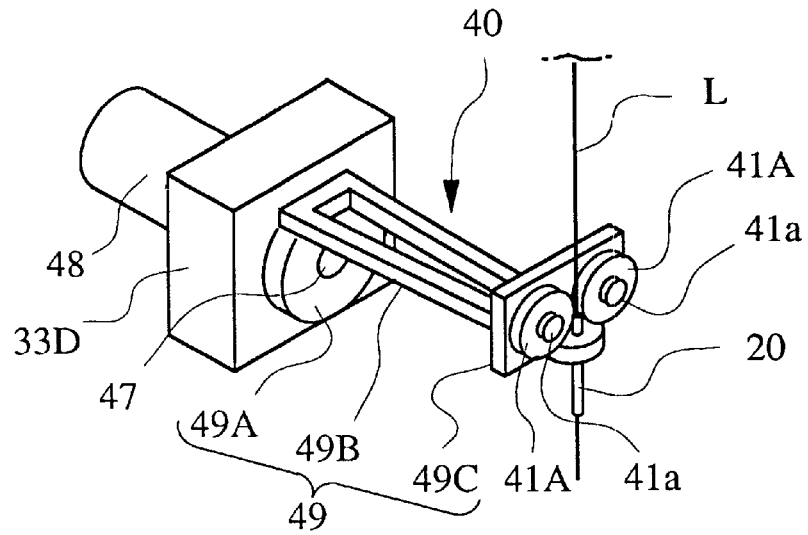
FIG. 2 is an enlarged perspective view of the nozzle and the direction setting means in FIG. 1.

In FIGS. 1 and 2, reference symbol M indicates a work piece (i.e., bobbin), reference symbols P indicate winding sections, reference symbols T indicate wire fixing sections (i.e., terminals), reference symbol L indicates a wire, reference symbol K indicates a base, reference numeral 10 indicates the winding machine, reference numeral 20 indicates a nozzle, reference numeral 30 indicates driving means, reference numeral 40 indicates direction setting means, reference numeral 50 indicates winding section rotating means, reference numeral 60 indicates wire cutting means (i.e., a wire cutter), reference numeral 70 indicates a temporary tying pin, and reference numeral 80 indicates a wire supply section.

Bobbin M is, for example, a transformer such as a flyback transformer of multi-core winding, as shown in FIG. 1, which may be made of an industrial plastic. The bobbin comprises winding section P having a substantially rectangular cross-sectional shape. Plural terminals T for connecting wire L are provided, for example, on the upper face of winding section P.

Wire L, for example, has a diameter of 1.3 mm, and thus is a so-called thick wire.

On base K of the winding machine 10, nozzle 20 which is movable while pulling out wire L; driving means 30 for driving the nozzle 30; direction switching means 40 for setting the direction of nozzle 20; and winding section rotating means 50 for rotationally driving winding section P via winding section rotating shaft 51 so as to wind wire L.

The driving means 30 consists of three-directional driving sections 31, 32 and 33, that is, cross-direction driving section 31, longitudinal-direction driving section 32, and vertical-direction driving section 33, combined with each other.

These driving sections 31, 32, and 33 have approximately the same driving mechanism along each driving direction X, Y, and Z, as shown in FIG. 1.

First, vertical-direction driving section 33 will be explained.

The vertical-direction driving section 33 comprises, as shown in FIG. 1, two vertical-direction guides 33A arranged along driving direction Z, vertical-direction rotational shaft 33B arranged between and in parallel with the vertical-direction guides 33A and possessing male screw B on its surface, vertical-direction moving section 33C, combined with the vertical-direction rotational shaft 33B via a ball screw, being movable along the moving direction of vertical-direction guide 33A, vertical-direction connective section 33D connected with vertical-direction guides 33A, and vertical-direction drive source 33E for rotationally driving vertical-direction rotational shaft 33B.

The vertical-direction guides 33A are inserted into and disposed at guide holes 33G opened in vertical-direction connective section 33D so as to be freely movable along driving direction Z, and the vertical-direction guides 33A and the vertical-direction section 33C are integrally arranged.

The vertical-direction rotational shaft 33B is connected with (vertical-direction) drive source 33E via universal joint 33F, as shown in FIG. 1.

The moving range in driving direction Z of the vertical-direction moving section 33C is determined according to the range of male screw B arranged on vertical-direction rotational shaft 33B.

The cross-direction and longitudinal-direction driving sections 31 and 32, having structures similar to vertical-direction driving section 33, are respectively arranged along driving directions X and Y, as shown in FIG. 1.

The cross-direction driving section 31 is fixed on base K and comprises (cross-direction) driving source 31E, as shown in FIG. 1. The longitudinal-direction driving section 32 is disposed such that the section 32 is movable via cross-direction connective section 31D in the cross direction with respect to cross-direction driving section 31.

The longitudinal-direction driving section 32 comprises (longitudinal-direction) driving source 32E, and the vertical-direction driving section 33 is disposed such that the section 33 is movable via longitudinal-direction connective section 32D in the longitudinal direction with respect to longitudinal-direction driving section 32.

In vertical-direction driving section 33, vertical-direction connective section 33D is vertically projected, in the downward direction, from vertical-direction rotational shaft 33B. Nozzle 20 is provided in vertical-direction driving section 33 via vertical-direction moving section 33C coupled with vertical-direction rotational shaft 33B and via vertical-direction connective section 33D, where nozzle 20 can move in the vertical direction with respect to vertical-direction driving section 33.

Driving sources 31E, 32E, and 33E are, for example, servo motors which can be accurately controlled.

Direction setting means 40 is arranged at vertical-direction connective section 33D, as shown in FIGS. 1 and 2, wherein the direction of nozzle 20 can be set via a separate operation from a moving operation of nozzle 20 by driving means 30, and nozzle 20 is rotatable via a direction-setting rotating shaft which is perpendicular to winding section rotating shaft 51 of winding section rotating means 50. The direction setting means 40 comprises direction-setting rotational shaft 47, rotatably arranged in a cross direction of vertical-direction connective section 33D; driving source 48 for driving direction-setting rotational shaft 47; and direction-setting connective section 49, connected with the direction-setting rotational shaft 47, to which nozzle 20 is attached.

Driving source 48 is, for example, a servo motor which can be accurately controlled.

The direction-setting connective section 49 comprises, as shown in FIGS. 1 and 2, direction-setting rotational member 49A, vertically connected to direction-setting rotational shaft 47; and direction-setting connective member 49B which is arranged away from the axis of direction-setting rotational shaft 47 and which is connected, via direction-setting rotational member 49A, with direction-setting rotational shaft 47 in parallel with the shaft. At the head of direction-setting connective member 49B, nozzle 20 is attached in a direction perpendicular to the direction of direction-setting rotational shaft 47, wherein the head of nozzle 20 intersects an extension line of direction-setting rotational shaft 47.

The head of nozzle 20 which intersects an extension line of direction-setting rotational shaft 47 is movable with respect to base K in an integral moving form with the direction-setting rotational shaft 47. Therefore, the position of nozzle 20 during winding can be determined by setting the position of the direction-setting rotational shaft 47 with respect to terminal T by using driving means 30.

The direction-setting rotational member 49A has a disk shape, and near the edge of the disk, the direction-setting connective member 49B of an arm shape is attached.

The nozzle 20 is attached at the head of arm-shaped direction-setting connective member 49B. The base end of the nozzle is disposed between two guide rollers 41A accompanied with board shape support member 49C. The rotational shafts 41a of guide rollers 41A are arranged in parallel with direction-setting rotational shaft 47 so as to fix an angle of entry of wire L from wire supply section 80 into nozzle 20, for example, an angle in parallel with the nozzle. In addition, opening 20a at the entrance of nozzle 20 is disposed between circumferential faces of guide rollers 41A.

The winding section rotating section 50 attached to base K comprises winding section rotational shaft 51 arranged in direction Y as shown in FIG. 1, and driving source 52 for rotationally driving the winding section rotational shaft 51. The driving source 52 may be a spindle motor.

A bobbin fixing section 53 for fixing bobbin M and temporary tying pin 70 are provided at winding section rotational shaft 51.

Wire cutting means (wire cutter) 60 is, as shown in FIG. 1, disposed at a position on base K, suitable for cutting wire L, and comprises cutter 61 for cutting wire L, connected with motion rail 62 via cutting operating section 63; a driving source (not shown), provided inside the motion rail 62, for moving cutter 61 along motion rail 62 by cutting operating section 63; and the cutting operating section 63 for making cutter 61 perform a cutting operation during and in cooperation with the driving operation along motion rail 62 by the driving source.

Temporary tying pin 70 is disposed on winding section rotational shaft 51 of winding section rotating means 50 in a significantly vertical direction with respect to the rotational shaft 51, and, as a result, wire L between terminal T and temporary tying pin 70 can be cut by wire cutter 60.

The wire supply section 80 comprises a wire spool not shown, and tension means 81 for applying fixed tension to the wire which is supplied to nozzle 20 as shown in FIG. 1. The tension means 81, positioned at the upper side of base K, comprises arm 82 whose base end is rotatably supported; delivery roller 83 attached to the head of arm 82; and supply roller 84 for supplying wire L, which is supplied from the wire spool (not shown), to delivery roller 83.

When wire L supplied via supply roller 84 is further supplied to guide roller 41A, delivery roller is pulled up via the arm 82, and thereby tension is applied to wire L.

Hereinbelow, operations of winding machine 10 will be explained.

First, as shown in FIG. 1, tension is provided by tension means 81 to wire L supplied from wire spool, not shown, and the wire L is pulled out via guide roller 41A and nozzle 20 from the head of nozzle 20. Therewith, the wire L is wound around temporary tying pin 70. In this operation, nozzle 20 is positioned downward by rotating direction-setting rotational shaft 47 via direction setting means 40, as shown in FIG. 1.

Bobbin M is fixed to bobbin fixing section 53 connected with winding section rotating shaft 51 whose rotational position is determined so as to satisfy a condition in that temporary tying pin 70 is positioned at the side of wire cutter 60. In this operation, terminals T are attached, for example, to be positioned in the substantially upward and vertical direction.

Next, driving means 30 is operated as described later so that the nozzle 20 positioned downward is shifted from a position near to temporary tying pin 70 to a position where a tying operation to terminal T can be performed, by which wire L is extended.

In the above operations, the position of nozzle 20 is set by direction setting means 40 such that the angle between wire L pulled out from nozzle 20 and the axis of nozzle 20 is always 10 degrees or less. To realize this condition, for example, the head of nozzle 20 is positioned backward with respect to the moving direction of nozzle 20.

When nozzle 20 is moved, the angle of entry of wire L to the opening 20a at the base end of nozzle 20 is fixed by guide rollers 41A, and the head of nozzle 20 is positioned intersecting an extension line of direction-setting rotational shaft 47. Therefore, the direction of nozzle 20 can be set under a condition in that the position of wire L pulled out from nozzle 20 is fixed with respect to driving means 30.

Next, by driving the driving means 30 and the direction setting means 40, a tying operation of wire L to terminal T of bobbin M which is fixed to winding section rotating means 50 is performed.

In this operation, nozzle 20 is driven by the three-axis simultaneous driving mechanism consisting of cross-direction driving section 31, longitudinal-direction driving section 32, and vertical-direction driving section 33, by which the nozzle is moved as close as possible to the terminal T. Also in this operation, the setting operation of the direction of nozzle 20 is performed in synchronism with the driving operation of driving means 30.

In the vertical-direction driving section 33, as shown in FIG. 1, vertical-direction rotational shaft 33B is rotationally driven via universal joint 33F by vertical-direction driving source 33E. According to the rotation of this vertical-direction rotational shaft 33B, vertical-direction moving section 33C, combined with the vertical-direction rotational shaft 33B via a ball screw, is moved in driving direction Z along the moving direction of vertical direction guides 33A. Accordingly, vertical-direction connective section 33D integrally connected with vertical-direction moving section 33C is moved in the driving direction Z.

The vertical-direction moving section 33C is moved within a range defined by male screw B arranged on the vertical-direction rotational shaft 33B.

Similarly, in the cross-direction driving section 31 and longitudinal-direction driving section 32, cross-direction connective section 31D is moved in driving direction X, while longitudinal-direction connective section 32D is moved in driving direction Y, as shown in FIG. 1.

Therefore, in the cross-direction driving section 31, as shown in FIG. 1, longitudinal-direction driving section 32 is moved in the cross direction X with respect to terminal T on bobbin M fixed to winding section rotating means 50 attached to base K; vertical-direction driving section 33 is moved in the longitudinal direction Y with respect to longitudinal-direction driving section 32; and nozzle 20 is moved in vertical direction Z with respect to vertical-direction driving section 33, by which nozzle 20 is moved around terminal T of bobbin M.

Figure 3A:
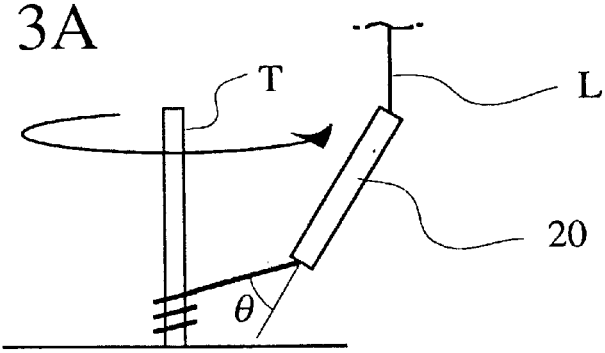
FIGS. 3A and 3B are typical side and perspective views which show a moving operation of the nozzle around the wire fixing section (or terminal) at the time of the tying operation.

That is, as shown in FIG. 3A, nozzle 20 performs the tying operation by moving around terminal T of bobbin M. Here, the direction of nozzle 20 is determined by direction setting means 40 in synchronism with the driving operation of driving means 30 so as to maintain a condition in which the angle between wire L and nozzle 20 is 10 degrees or less. For example, the head of nozzle 20 is slanted and its position is closer to terminal T than the positions of the remaining portions of nozzle 20 which turns around terminal T.

In the above operation, by reciprocatively and rotationally moving winding section rotating shaft 51, in synchronism with the rotational motion of nozzle 20, by using winding section rotating means 50, the angle between the axis of nozzle 20 and wire L pulled out from nozzle 20 becomes even smaller.

Figure 3B:
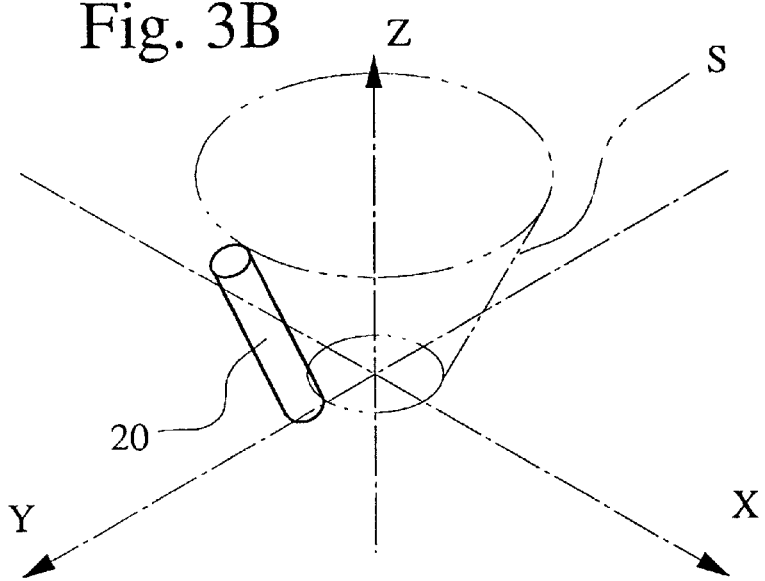

That is, as shown in FIG. 3B, nozzle 20 is moved along a substantially conical curved surface S, and the head of nozzle 20 is positioned backward with respect to the moving direction of nozzle 20.

After that, wire L between the temporary tying pin 70 and the terminal T is cut by wire cutter 60.

In the wire cutter 60, as shown in FIG. 1, cutting operating section 63 is moved by the driving source (not shown) toward temporary tying pin 70 along motion rail 62, by which cutter 61 is shifted so as to make the winding of wire L possible. In cooperation with the shifting, cutter 61 performs a cutting operation via cutting operating section 63, by which wire L is cut.

After the cutting operation is completed, cutter 61 is again shifted by the driving source (not shown) via cutting operating section 63 along motion rail 62, in the direction opposite to the direction of the cutting operation, so as to set the position of the cutter where winding by nozzle 20 is possible.

After wire L is cut, nozzle 20 is moved near the winding section P by driving means 30 and bobbin M is rotated by winding section rotating means 50, by which wire L is wound around winding section P. Simultaneously, the nozzle 20 is moved along the direction of the length of winding section P by the diameter of wire L for each round of the winding of wire L.

In the above operation, the direction of nozzle 20 is set by direction setting means 40 so as to maintain the angle between wire L and nozzle 20 at 10 degrees or less. In order to satisfy the above condition, for example, the head of nozzle 20 is positioned backward with respect to the moving direction of nozzle 20.

When the winding for winding section P is completed, nozzle 20 is driven and moved around terminal T by driving means 30 and direction setting means 40, as explained above, so that wire L' can be wound around and tied to wire fixing section (i.e., terminal) T. A similar operation is then performed so as to perform a winding operation for another winding section P or a tying operation for another terminal T.

When the winding operations and the tying operations for terminal T are completed, nozzle 20 is moved by driving means 30 and direction setting means 40, as described above, and wire L extended to temporary tying pin 70 is temporarily fixed to the temporary tying pin 70.

After that, the wire L between terminal T and temporary tying pin 70 is cut by wire cutter 60, as described above, and all winding operations for bobbin M are then completed.

In such winding and tying operations using winding machine 10, friction imposed on wire L at opening 20a of the base-end side of nozzle 20 is reduced using guide rollers 41A, and the direction of nozzle 20 is set by direction setting means 40 so as to maintain the angle between wire L and nozzle 20 at 10 degrees or less, by which friction between wire L and the head of nozzle 20 is reduced. Therefore, it is possible to prevent wire L from receiving tension larger than a necessary amount of tension imposed by tension means 80.

In the winding operation, the position of the wire is determined by setting the relative position of nozzle 20 with respect to winding section P by using driving means 30 and direction setting means 40, whereby it is possible to obtain an effect in which at each round of winding, the wire contacts with and slides along the surface of the portion of the wire which was wound in the previous round and thus the wire is naturally drawn up, and another effect in which the wire is wound and drawn up with any desired spacing.

Stepping motors can be used as driving sources 31E, 32E, 33E, 48 and 52, and as wire L, it is possible to use a wire having any diameter, for example, a thin wire having the diameter of 0.02 mm.

In addition, when wire L is wound around winding section P by moving nozzle 20, nozzle 20 may be driven only by driving means 30 and direction setting means 40.

Figure 4A:
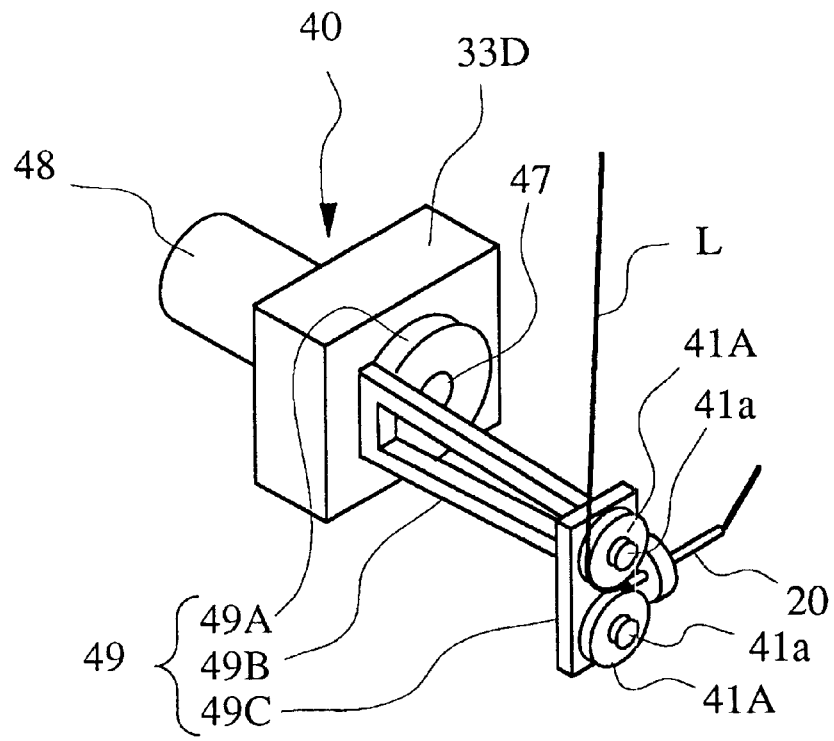
FIGS. 4A and 4B are perspective views showing the nozzle and its angle situation set by the direction setting means.
Figure 4B:
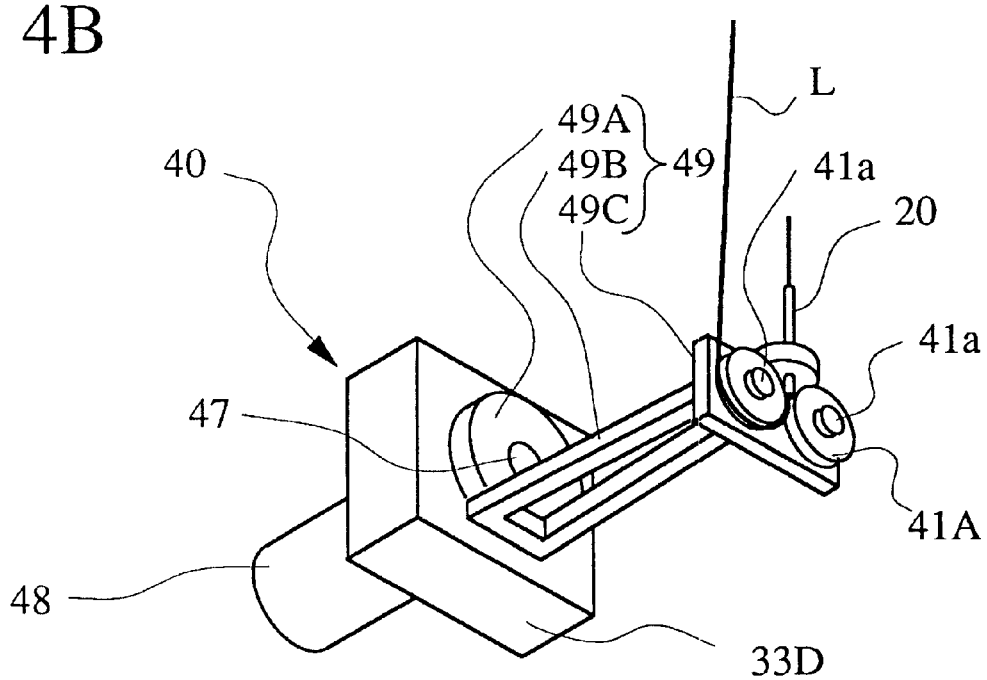

Furthermore, if terminal T is arranged on a side face or a bottom face of bobbin M fixed to winding section rotating section 50, the tying operation for terminal T can be performed by setting nozzle 20 in a longitudinal direction and in the vertical and upward direction using direction setting means 40, as shown in FIGS. 4A and 4B, and by moving nozzle 20 using driving means 30 under the above directional condition.

Figure 5:
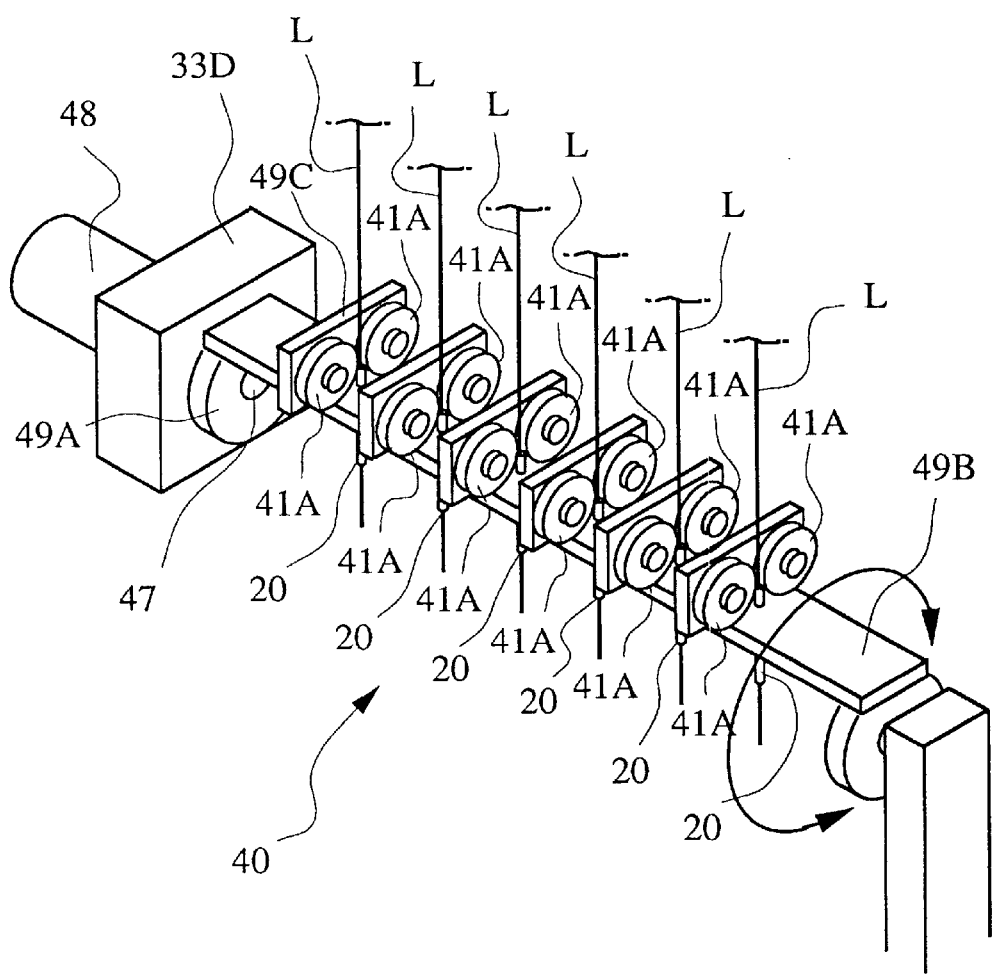
FIG. 5 is a perspective view showing the nozzle and the direction setting means as another embodiment of the winding machine and method according to the present invention.
Figure 6:
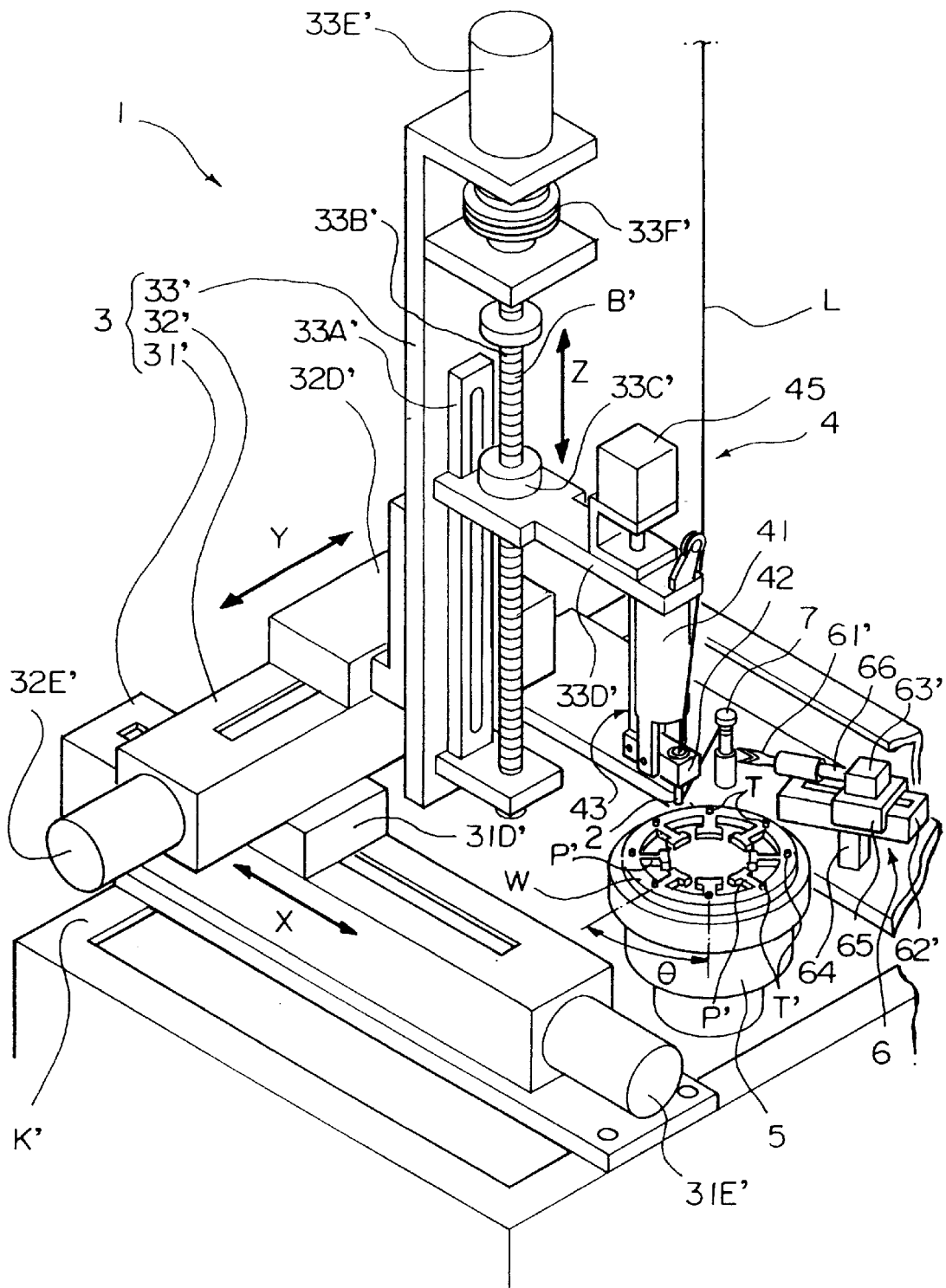
FIG. 6 is a perspective view showing a conventional winding machine.
Figure 7:
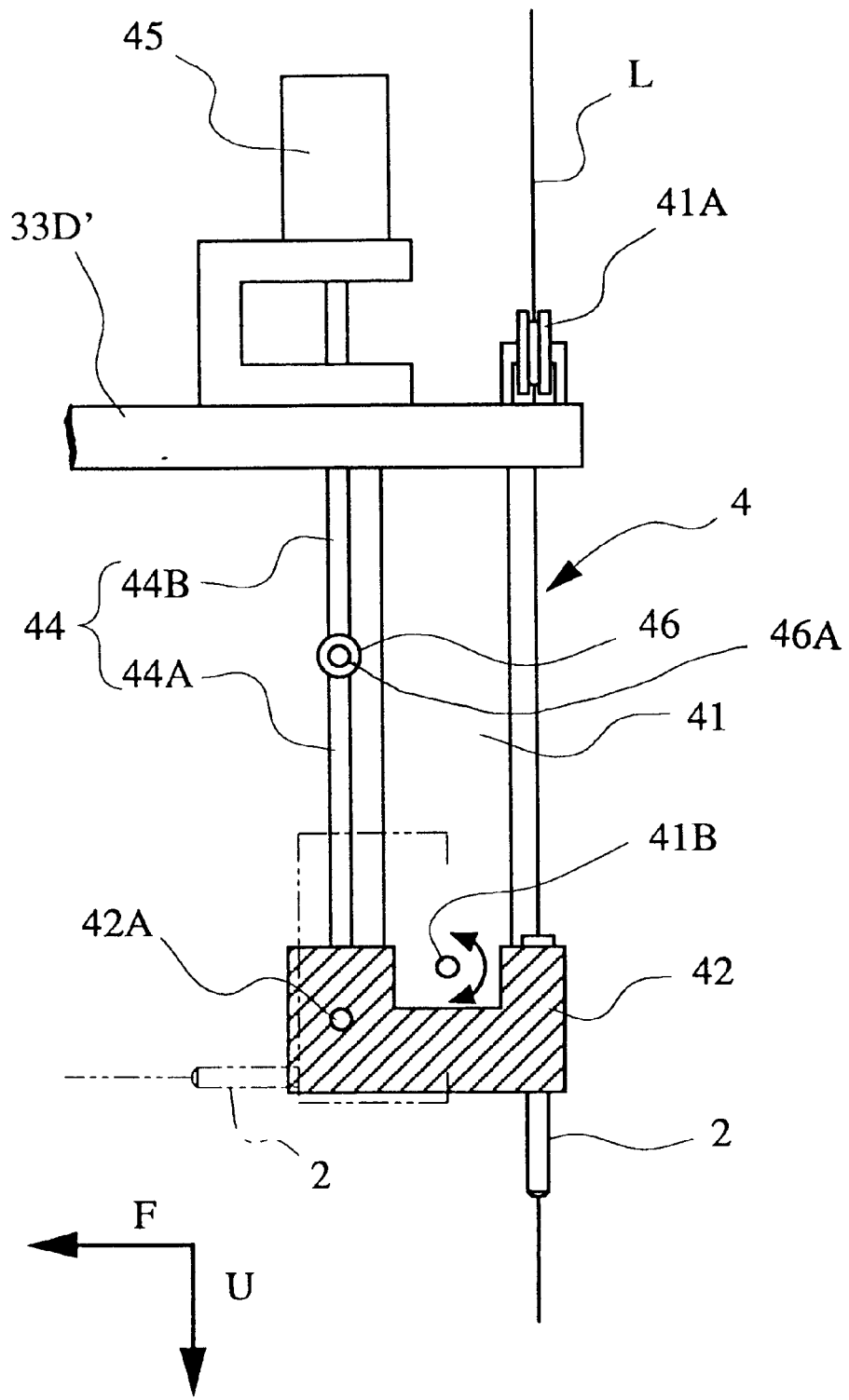
FIG. 7 is an enlarged side view showing the nozzle and its neighboring area in FIG. 6.
Figure 8A:
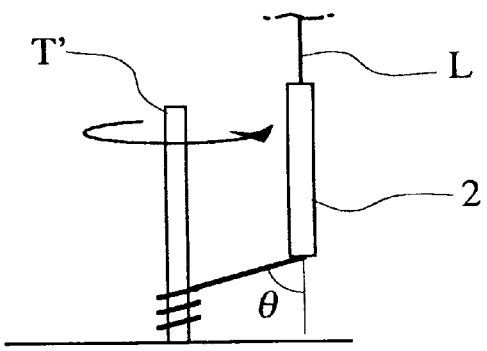
FIGS. 8A and 8B are typical side and perspective views showing a situation of the nozzle moving around the wire fixing section (or terminal) at the tying operation of the nozzle in the conventional winding machine.
Figure 8B:
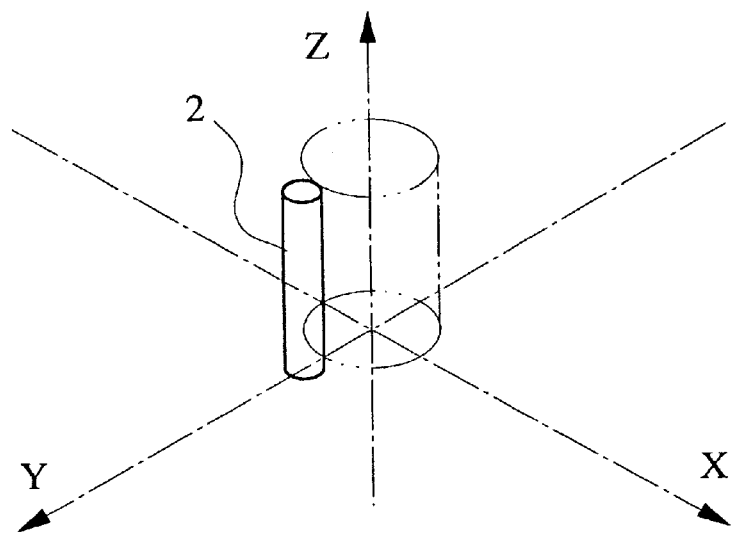
Figure 8C:
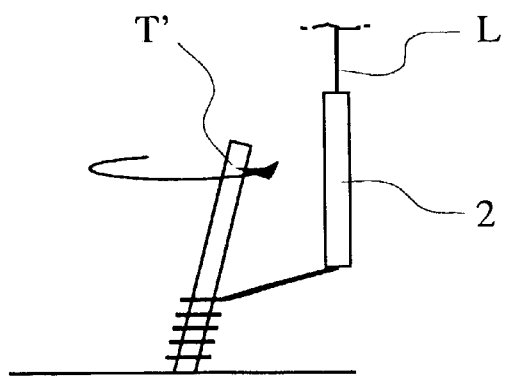
FIG. 8C is a typical perspective view showing a deformed situation of the terminal.

In another embodiment according to the present invention, as shown in FIG. 5, plural nozzles 20 and plural sets of two guide rollers 41A supported by support members 41C are arranged in a parallel form on direction-setting connective member 49B of direction setting means 40 in the axial direction of direction-setting rotational shaft 47. Also in this embodiment, plural winding section rotating shafts of the winding section rotating means (not shown) are arranged in parallel on base K. According to the structure of this embodiment, winding and tying operations can be simultaneously performed for plural bobbins M.

What is claimed is:

1. A winding machine comprising:
    a nozzle having a head and a base end, said nozzle being movable while letting out a wire;
    driving means for driving the nozzle; and
    winding section rotating means having a winding section rotating shaft for rotating a winding section so as to wind the wire, and
    the machine further comprising direction setting means for setting the direction of the nozzle, and
    wherein the wire is wound around the winding section via rotation of the winding section using the winding section rotating means, and when the wire is extended to a wire fixing section, which is positioned near the winding section and to which the wire is fixed, by moving the nozzle using the driving means at the time of starting or ending the winding, the above fixing is performed using the driving means while the direction of the nozzle is set by the direction setting means, and
    wherein the direction setting means is disposed between the driving means and the nozzle, the direction of the nozzle can be set in synchronism with or independently of the motion of the nozzle by the driving means, and the nozzle is rotatable by a direction-setting rotational shaft perpendicular to the winding section rotating shaft.

2. A winding machine as claimed in claim 1, wherein:
    the direction setting means comprises a direction-setting rotational shaft rotatably attached to the driving means, a driving source for driving the direction setting rotational shaft, and a direction-setting connective section connected to the direction-setting rotational shaft,
    the direction-setting connective section, having a head, includes a direction-setting rotational member which is connected to the direction-setting rotational shaft, and a direction-setting connective member which is arranged away from the axis of the direction-setting rotational shaft and which is connected to the direction-setting rotational member in parallel with the direction-setting rotational shaft, and the nozzle is attached to the head of the direction-setting connective section in a manner such that the axial directions of the nozzle and the direction-setting rotational shaft are orthogonal.

3. A winding machine as claimed in claim 2, wherein the head of the nozzle is arranged in a manner such that the head intersects an extension line of the direction-setting rotational shaft.

4. A winding machine as claimed in claim 3, wherein plural guide rollers are provided at the base end of the nozzle for making the wire substantially parallel with the nozzle when the wire enters the nozzle from a wire supply section.

5. A winding machine as claimed in claim 4, wherein each of the guide rollers has a rotational shaft, and each of the guide roller rotational shafts is arranged in parallel with the direction-setting rotational shaft.

6. A winding machine as claimed in claim 2, wherein the direction-setting rotational member has a disk shape, the direction-setting connective member is attached near an edge of the disk-shaped direction-setting rotational member.

7. A winding method performed by a winding machine comprising a nozzle having a head and a base end, the nozzle being movable while letting out a wire; driving means for driving the nozzle; direction setting means for setting the direction of the nozzle; and winding section rotating means having a winding section rotating shaft for rotating a winding section, wherein the direction setting means is disposed between the driving means and the nozzle, the direction of the nozzle can be set in synchronism with or independently of the motion of the nozzle by the driving means, and the nozzle is rotatable by a direction-setting rotational shaft perpendicular to the winding section rotating shaft so as to wind the wire, and wherein the wire is wound around a winding section via rotation of the winding section by the winding section rotating means under a condition in which the direction of the nozzle is set such that the angle between the wire pulled out from the head of the nozzle and the axis of the nozzle is set to be a predetermined value; and when the wire is extended to a wire fixing section, which is positioned near the winding section and to which the wire is tied and fixed, by moving the nozzle, using the driving means at the time of starting or ending the winding, the wire is tied and fixed to the wire fixing section.

8. A winding method as claimed in claims 7, wherein when the wire is tied to the wire fixing section, the winding section is reciprocatively and rotationally moved, in synchronism with the driving motion of the nozzle, by the winding section rotating means, under a condition in which the angle between the wire pulled out from the head of the nozzle and the axis of the nozzle is set to be a value by which friction between the wire and the nozzle is reduced.

* * * * *